United States Patent [19]

Blaustein et al.

[11] Patent Number: 4,750,443
[45] Date of Patent: Jun. 14, 1988

[54] FIRE-BLOCKING TEXTILE FABRIC

[75] Inventors: Michael A. Blaustein, Wilmington; Dennis A. Nollen, Hockessin; Loretta A. G. Page, Newark, all of Del.

[73] Assignee: E. I. Du Pont de Nemours and Company, Wilmington, Del.

[21] Appl. No.: 898,581

[22] Filed: Aug. 21, 1986

Related U.S. Application Data

[63] Continuation-in-part of Ser. No. 728,879, Apr. 30, 1985.

[51] Int. Cl.$^4$ .................. A47C 27/00; B32B 7/08; B32B 27/34; B64D 25/02
[52] U.S. Cl. .................................. 112/420; 2/8; 5/459; 112/440; 244/121; 244/122 R; 297/219; 297/DIG. 5; 428/71; 428/219; 428/287; 428/340; 428/423.5; 428/474.7; 428/902; 428/920; 428/921
[58] Field of Search .................. 5/459; 112/420, 415, 112/440; 297/DIG. 5, 219; 428/219, 340, 287, 902, 920, 71, 423.5, 474.7, 921; 2/8; 244/121, 122 R

[56] References Cited

U.S. PATENT DOCUMENTS

| 4,120,914 | 10/1978 | Behnke et al. | 524/538 |
|---|---|---|---|
| 4,198,494 | 4/1980 | Burchel | 525/143 |
| 4,255,817 | 3/1981 | Heim | 428/920 |
| 4,284,680 | 8/1981 | Awano et al. | 428/287 |
| 4,463,465 | 8/1984 | Parker et al. | 428/921 |
| 4,473,614 | 9/1984 | Hockmeyer | 428/921 |
| 4,482,603 | 11/1984 | Yoshida et al. | 428/287 |
| 4,529,644 | 7/1985 | Awano et al. | 428/287 |

FOREIGN PATENT DOCUMENTS 0128712 12/1984 European Pat. Off. .

OTHER PUBLICATIONS

Research Disclosure, Item 22215, "Lightweight Aramid Nonwovens for Thermal Protection," p. 345-346 (Oct., 1982).

Primary Examiner—James C. Cannon

[57] ABSTRACT

A textile fabric suitable for use as a fire-blocking sheet in aircraft seat cushion comprises three to seven, fastened together nonwoven layers of hydarulically needled batts of aramid staple fibers.

12 Claims, No Drawings 4,750,443

FIRE-BLOCKING TEXTILE FABRIC

CROSS-REFERENCE TO RELATED APPLICATION

This application is a continuation-in-part of application Ser. No. 728,879, filed Apr. 30, 1985.

BACKGROUND OF THE INVENTION

1. Field of the Invention

This invention relates to a textile fabric suitable for use as a fire-blocking sheet in aircraft seats and more particularly concerns such a fabric comprising several layers of hydraulically needled batts of aramid staple fibers.

2. Description of the Prior Art

Aircraft seat cushions now in use typically comprise a core of flame-retardant polyurethane foam and a woven upholstery outer covering (also called a "dress fabric"). The materials and construction of these seat cushions are designed to prevent an accidental fire from occurring if a lighted cigarette were to come into contact with the seat. However, in a full-scale cabin fire, the outer upholstery cover commonly used on seat cushions rapidly breaks down and the polyurethane core becomes involved in the fire, producing large volumes of potentially lethal smoke, combustible gases and toxic gases. For aircraft safety, the Federal Aviation Administration (FAA) requires in the United States, that the foam core of an aircraft seat cushion must be fully encapsulated by a fire-blocking sheet which delays the onset of ignition and retards involvement of the core in the fire. For some aircraft, the seat cushion must also be buoyant for use as an emergency life preserver in the event of a crash landing in water. In addition to meeting FAA requirements, the fire blocking sheet preferably should be lightweight as practicable so that aircraft fuel consumption might be minimized.

Expanded papers made from commingled mixtures of aramid fibrids and aramid fibers, including blends of fibers of poly(m-phenylene isophthalamide) and poly(p-phenylene terephthalamide), have been disclosed in Nollen et al, European Patent Application Publication No. 0 128 712 as being useful for fire blocking sheets. However, these expanded papers do not meet the standards imposed by commercial airlines with respect to puncture resistance. Such fire blocking sheets usually would be punctured by high-heeled shoes, if a person wearing such shoes were to stand on the seat.

Woven and nonwoven fabrics of aramid fibers and blends thereof are now widely used in protective clothing worn by aviators, race drivers, and others who risk exposure to fires or an intense thermal flux.

Burckel, U.S. Pat. No. 4,198,494 discloses fiber blends which comprise, for example, at least 15% poly(m-phenylene isophthalamide) (MPD-I) fibers and 3 to 20% poly(p-phenylene terephthalamide) (PPD-T) fibers. The MPD-I fibers meld or fuse when exposed to intense thermal flux and the PPD-T fibers have high flame strength when in fabric form. Clothing made with such fibers is resistant to fabric break-open when exposed to flame or intense thermal flux.

Behnke, U.S. Pat. No. 4,120,914 discloses blends of 45-55 wt % MPD-I fibers with 45-55% wt % PPD-T fibers which, in fabric form, exhibit good resistance to shrinkage at high temperature and are correspondingly useful for protective clothing.

Research Disclosure, Oct. 1982, Item 22215 discloses that spunlaced nonwoven fabrics made of the MPD-I/PPD-T fiber blends provide even more thermal protection than woven fabrics of the same basis weight.

In view of the foregoing disclosures, it might have been hoped that woven or nonwoven fabrics of MPD-I/PPD-T blends would be effective as fire blocking fabrics for aircraft seat cushions. However, the fabrics of MPD-I/PPD-T blends that have been available hitherto have failed to meet the FAA requirements.

BRIEF DESCRIPTION OF THE INVENTION

This invention provides a textile fabric suitable for use as a fire blocking sheet. The fabric comprises three to seven, fastened-together layers of nonwoven fabric. Each nonwoven layer is a non-apertured, hydraulically needled batt that weighs in the range of 1 to 3 oz/yd$^2$ (about 30 to 100 g/cm$^2$) and consists essentially of 25 to 100 weight percent of poly(p-phenylene terephthalamide) staple fibers and 0 to 75 weight percent of poly(m-phenylene isophthalamide) staple fibers. The total weight of all layers of the textile fabric is at least 6 oz/yd$^2$ (about 200 g/cm$^2$). Preferably, at least one of the nonwoven fabric layers consists essentially entirely (i.e., about 100%) of poly(p-phenylene terephthalamide) fibers. Preferably, there are four to six nonwoven fabric layers. The individual nonwoven fabric layers preferably have been stretched in the range of 10 to 20% in the cross-machine direction after hydraulic needling. Preferably, the individual nonwoven fabric layers each weigh in the range of 1.5 to 2.0 oz/yd$^2$ (about 50 to 70 g/m$^2$). Preferably, the fastening is provided by an aramid thread in the form of zig-zag stitching in a diamond pattern.

DETAILED DESCRIPTION OF THE INVENTION

The textile fabric of the present invention is not apertured. If the fabric were apertured, hot gases could penetrate the fabric and thereby promote flame propagation. The individual nonwoven layers are formed without apertures by proper control of the hydraulic needling conditions under which the layers are prepared.

The textile fabric of the present invention can perform satisfactorily as a fire blocking sheet when the fabric contains at least three of the hydraulically needled nonwoven fabric layers of aramid fibers. More than seven of the nonwoven layers do not add significant further protection. Preferably, four to six layers are used. The fastened-together layers of the fabric of the invention can include a layer of woven fabric of flame-resistant fibers, especially as an outer layer, to impart greater dimensional stability and abrasion resistance to the over-all fabric.

The total weight of the fabric is at least 6 oz/yd$^2$ (about 200 g/m$^2$) to provide the desired fire-blocking protection. Total fabric weights of greater than 10 oz/yd$^2$ (about 350 g/m$^2$) provide unneeded extra protection and add unnecessary weight. Generally, the density of the fabric is in the range of 0.10 to 0.15 g/cm$^3$, but more usually in the range of 0.11 to 0.14 g/cm$^3$.

The layers are fastened together in such a way that they are restrained from moving with respect to one another. However, when the fastening is removed, the layers are readily separable from each other. Continuous lengths of the hydraulically needled layers can be conveniently fastened together by stitching of stacked layers in the machine-direction with a flame-resistant thread. A zig-zag stitching of aramid thread is preferred with the extremes of the stitching just touching each other to form a diamond-like pattern. Other fire-resistant fastening means can be used, as for example, adhesives and the like.

In its usual use as a fire-blocking sheet, the fabric of the invention completely covers a cushion of flame-resistant polyurethane foam. The thusly covered cushion usually is covered further with an outer, woven or knit dress fabric or other material, such as leather.

The amount of protection that must be provided by the fire blocking sheet depends on the nature of the polyurethane foam cushion and of the dress cover material. In general, two types of polyurethane foam cushions are used in commercial airlines; molded or fabricated cushions. The polyurethane foam of molded cushions typically is made by reacting a diisocyanate such a methylenedianiline diisocyanate and a polyol. The polyurethane foam of the fabricated cushions typically is made by reacting a diisocyanate, such as toluene diisocyanate, and a polyol. A flame retardant material usually is included in each of the compositions. The polyurethane foam of the molded cushions is formed directly to final dimensions. For the fabricated cushions, the polyurethane foam is formed in bulk and then cut into pieces, which are then bonded together into a seat cushion of the desired shape and size. The fabricated cushions usually are less dense than the molded cushions and present a more severe fire-protection problem.

Seat cushions of molded polyurethane foam with a dress cover of woven wool/nylon (90/10) fabric usually can be adequately protected by a textile fabric of the present invention which has a total weight in the range of 6 to 7.6 oz/yd$^2$ (200 to 260 g/m$^2$) and is made by quilting together with an aramid sewing thread four layers of 1.5-to-1.9-oz/yd$^2$ (about 50 to 65 g/m$^2$) non-apertured spunlaced nonwoven fabrics containing about 70% MPD-I fibers and about 30% PPD-T fibers. Predominantly aramid closure devices are used to fasten the fire blocking sheet as a slip cover over the foam cushion and to fasten the dress fabric over the slip-covered cushion.

Use of a woven 100% nylon dress fabric in place of a woven wool/nylon (90/10) fabric increases the amount of fire-blocking protection needed. Use of fabricated polyurethane foam cushions in place of molded polyurethane foam cushions also increases the amount of protection needed. Leather-covered seat cushions present a very severe problem.

In constructions which require greater protection, a five-layer fire-blocking fabric of the invention can be used. Such a five-layer fabric has a total weight in the range of 7.5 to 9.5 oz/yd$^2$ (about 250–320 g/m$^2$) and is made by quilting together with an aramid sewing thread five layers of 1.5 to 1.9 oz/yd$^2$ (about 50–65 g/m$^2$) non-apertured spunlaced nonwoven fabrics containing about 70% MPD-I fibers and about 30% PPD-T fibers. The same type of closure devices as described in the preceding paragraph for the four-layer fabric are also suitable for the five-layer fabric. Still further protection is achievable by use of a higher proportion of PPD-T fibers in some or all of the nonwoven fabric layers. Layers of 100% PPD-T fibers are particularly effective.

Closure devices used to make slip covers of the fire blocking sheet and to fasten the dress fabric to the slip-covered cushions preferably are made of predominantly aramid polymer. Closure devices of conventional 6-6 nylon polymer are flammable and increase the amount of protection required. Hook and loop fasteners, such as those disclosed by Industrial Fabric Products Review, December, 1982, page 25, are particularly suited for use as closure devices with the fabrics of the present invention. As used herein, these devices are identified further as "Velcro" hook fasteners and "Velcro" loop fasteners. The predominantly aramid closure devices, have loop fasteners made of substantially 100% MPD-I polymer and the hook fasteners made with hooks of 6-6 nylon protruding from an MPD-I backing.

Process for Making Aramid Spunlaced Layers

Hydraulic entangling of fiber batts to form a spunlaced fabric is referred to herein as "hydraulic needling". Spunlaced fabrics employed in fire blocking structures of the invention are lightweight, without apertures or patterns, and can be made by the process of Bunting et al, U.S. Pat. No. 3,508,308. The spunlaced fabrics can be made from relatively short (e.g., 2-cm long) aramid staple fibers. The fibers comprise 25 to 100 weight % PPD-T fibers blended with 0 to 75 weight % crystalline MPD-I fibers. The PPD-T fibers have a modulus of at least $6 \times 10^5$ kg/cm$^2$ ($9 \times 10^6$ psi), have a denier per filament of 1 to 2 and can be prepared by methods of Blades, U.S. Pat. No. 3,767,756. The crystalline MPD-I fibers have a denier per filament of 1 to 2 and can be prepared by methods of Alexander, U.S. Pat. No. 3,133,138. Other fibers such as flame-resistant polybenzimidazole or carbon fibers also can be present. Usually, the staple fibers are carded, cross-lapped and then air-laid into a batt by methods of Zafiroglu, U.S. Pat. No. 3,797,074. The air-laid is then consolidated by a light hydraulic needling (i.e., under relatively low pressure jets) and then fully entangled by repeated hydraulic needling with higher pressure jets, alternately from the top and bottom of the web. Typical hydraulic needling conditions are set forth in Examples 1 and 3. Batts of 100% PPD-T fibers are hydraulically needled with somewhat higher energies than batts of MPD-I/PPD-T fiber blends (e.g., at higher water jet pressures and with 7-mil (0.18-mm) rather than 5-mil (0.13 mm) diameter orifices).

Test for Flammability of Seat Cushions

All measurements reported herein for the flammability of seat cushions were made in accordance with United States Department of Transportation, Federal Aviation Administration, Federal Register, Vol. 49, No. 209, Oct. 26, 1984, pp. 43,133–43,200, specifically, "Part II - Flammability of Seat Cushions", pp. 41,393–43,199.

For each measurement, a test specimen which included a particular size of seat bottom and seat back cushion that had been completely enclosed by a test fire-blocking material and further covered with an outer dress fabric was exposed to a flame under specific conditions, as described in the following paragraphs.

Test seat bottom cushions were 18 inches wide by 20 inches deep by 4 inches thick (457 mm by 508 mm by 102 mm) and test seat back cushions were 18 in wide $\times$ 25 in high $\times$ 2 in thick (457 mm $\times$ 635 mm $\times$ 51 mm). These dimensions do not include the fabric closure and seam overlap and have a tolerance of $\pm \frac{1}{8}$ in ($\pm 3$ mm). Four specimens of polyurethane foam cushion materials were used in the tests and are identified as follows:

| Cushion Set | Foam Type | Density (lb/ft³) Seat | Back |
| --- | --- | --- | --- |
| a | Molded | 3 | 3 |
| b | Fabricated | 2.8 | 2.8 |
| c | Fabricated | 2.2 | 2.2 |
| d | Fabricated | 2.8 | 1.65 |

Cushion Set "a" was used in Example 1 and Comparisons A and C; Set "b", in Examples 4 and 5; Set "c", in Example 6 and Comparison B; and Set "d", in Examples 2 and 3 and Comparison D.

In each example or comparison that involved testing of a multi-layered fire-blocking fabric, the fabric layers were sewn together by aramid threads that ran lengthwise along the layered sheets in zigzag fashion to form diamond-shaped stitch patterns. The diamonds measured about 7.6 cm (3 in) long and 5 cm (2 in) wide at the widest point and corners of the diamonds in adjacent lengthwise rows substantially touched each other. For the fire-blocking fabric of Examples 1, 2 and 3 and Comparisons A and D, the stitches were formed with a PPD-T 20/2 cotton count thread. For the fire-blocking fabric of all other examples and comparisons, the stitches were formed with an MPD-I 45/3 cotton count sewing thread; in Examples 4, 5 and 6, the stitches also included a PPD-T 20/2 cotton count bobbin thread. Each fire-blocking fabric was then sewn with PPD-T thread to form snugly fitting seat covers which completely enclosed the seat cushions.

The test specimens also had an outer covering of a woven, 13 oz/yd² (440 g/m²) dress fabric. The fibers of all dress fabrics were of 90/10 wool/nylon blend, except those of Examples 4 and 5, which were of 100% nylon. The dress fabric was held snugly and securely to the slip-covered seat bottom cushion by closure devices comprising hook and loop fasteners. For the specimens of Examples 3 through 6, the fasteners were made of 6-6 nylon. For all other specimens, the fasteners were made predominantly of MPD-I aramid. The "Velcro" hook fasteners were sewn to the fire blocking slip cover on the underside of the cushion, about 2 in (5 cm) from each of the four sides of the cushion, and adhered to aligned "Velcro" loop fasteners sewn to the inside of the dress fabric. Thus, the dress fabric covered the entire top, all four sides, and the bottom edges of the slip-covered seat bottom cushion, but did not cover a portion of the fire-blocking fabric on the underside of the cushion. The fire-blocking slip cover of the seat back cushion was entirely covered by dress fabric. For the seat back cushion, the dress fabric was fashioned into a slip cover that had a flap at its back, which contained the same type of hook and loop fasteners and securely closed the slip cover around the cushion.

The test specimens prepared as described above were subjected for two minutes to a 1900±100° F. (1038°±38° C.) flame supplied from a burner and under burning conditions specified in the FAA procedure. At least three specimen sets of seat bottom and seat back cushions were tested for each fire blocking material. To pass the FAA test, (1) at least two-thirds of specimen sets containing the particular fire-blocking sheet under test must not have a burn length exceeding 17 inches (43 cm) and (2) the average weight loss of the cushion set must not exceed 10% with at least two-thirds of the specimen sets tested not exceeding a weight loss of 10%.

EXAMPLE 1

Crystalline poly(m-phenylene isophthalamide) (MPD-I) fibers having a dtex per filament of 1.65 (1.5 dpf) were prepared as described in Alexander, U.S. Pat. No. 3,133,138. Such fibers are commercially available as T-450 "Nomex" aramid fibers from E. I. Du Pont de Nemours and Co., Inc. Poly(p-phenylene terephthalamide) (PPD-T) fibers having a modulus of about $6 \times 10^5$ kg/cm2 (about $9 \times 10^6$ psi) and a dtex per filament of 1.65 (1.5 dpf) were prepared as described in Blades, U.S. Pat. No. 3,767,756. Such fibers are commercially available as Type 29 "Kevlar" aramid fiber from E. I. du Pont de Nemours and Co., Inc.). The MPD-I and PPD-T fibers were cut into staple fibers of 1.9-cm (0.75-in) length and blended in the ratio of 70% MPD-I to 30% PPD-T by weight.

The resulting staple fiber blend was formed into a batt by an air-laydown process of the type described in Zafiroglu, U.S. Pat. No. 3,797,074, and the batt was then formed into a non-apertured, spunlaced nonwoven fabric having a nominal basis weight of 1.5 oz/yd² (about 50 g/m²) by a three-stage treatment with columnar hydraulic jets delivered from sets of orifices located about 2.5 cm (1 in) from the batt surface. Each set of orifices was arranged in two staggered rows which were perpendicular to the direction of batt travel. The center lines of the orifices in the two rows were 0.1 cm (0.04 in) apart. Each orifice had a diameter of 0.127 mm (0.005 in) and was spaced midway between the two closest orifices in the other row. The spacing of orifices in these orifice sets was as follows:

| Orifice Set | Orifices per cm (per in) in each row |
| --- | --- |
| A | 7.9 (20) |
| B | 11.8 (30) |

During the hydraulic needling treatment, the batt was supported on wire mesh screens, under which means were provided for removing the water. The screens were constructed as follows:

| Screen | Wires per cm (in) | % Open Area |
| --- | --- | --- |
| I | 15.7 × 14.2 (40 × 36) | 39 |
| II | 39.4 × 36.2 (100 × 92) | 21 |

Table I summarizes the sequence of hydraulic jet treatments applied to the batt. In Stages 1 and 2, the jets impacted one face of the batt and in Stage 3, the other face. The batt was passed under the jets at a speed of 18.3 m/min (20 ypm). The batt was given a light hydraulic needling by a single orifice set at low pressure in Stage 1 to consolidate it. In Stage 2, the upper face of the batt was hydraulically needled by four sets of orifices operating at successively higher jet pressures. In Stage 3, the other face of the batt was hydrau)ically needled by three sets of orifices, first at low pressure and then at much higher pressures.

TABLE I

| Stage | Orifice Set | Screen Support | Jet Pressure kPa (psi) |
| --- | --- | --- | --- |
| 1 | A | I | 1379 (200) |
| 2 | A | II | 2758 (400) |
|   | A | II | 4827 (700) |
|   | A | II | 10343 (1500) |

TABLE I-continued

| Stage | Orifice Set | Screen Support | Jet Pressure kPa (psi) |
|---|---|---|---|
|   | A | II | 11032 (1600) |
| 3 | A | II | 1379 (200) |
|   | A | II | 10343 (1500) |
|   | B | II | 11032 (1600) |

Four sheets of the dried nonwoven fabric were sewn together to form a four-layer fire-blocking sheet weighing 6 oz/yd² (about 200 g/m²), which was then made into specimens for flammability testing by the FAA procedure described hereinbefore. Results of the flammability tests on three sets of the above-described specimens, along with the results of following Examples 2 and 3 and Comparisons A through D, are summarized in Table II, which immediately follows Example 3. The fire-blocking sheets of Example 1 clearly pass the FAA flammability test in that none of the tested specimens had burn lengths exceeding 17 inches and the individual weight losses, as well as the average weight loss, were each below 10% (the average loss was only 8.1%).

Comparisons Outside the Invention

Comparison A. The same blend of MPD-I and PPD-T staple fibers as were used in Example 1 were formed into a 6-oz/yd² (about 200-g/m²) non-apertured, spunlaced nonwoven fabric by the hydraulic needling process described in Example 2 of Kirayoglu, U.S. Pat. No. 4,555,601. The single layered fire-blocking sheet was then tested for flammability in accordance with the FAA test procedure in specimens that included the dense, molded, polyurethane foam seat cushions of Cushion Set "a". Although this fire-blocking sheet passed the burn length portion of the test, it failed the weight loss portion of the test with an average weight loss of just greater than 10%. Thus, this one-layer fire blocking sheet was inadequate for passing the FAA flammability test, even when used with the more easily protected dense, molded polyurethane foam cushions.

Comparisons B and C. MPD-I and PPD-T staple fibers of the first paragraph of Example 1 were blended in the weight ratio of 85 parts MPD-I fibers and 15 parts PPD-T fibers. The blended fibers were formed into a batt and then hydraulically needled as in Example 1 to form a non-apertured spunlaced fabric having a nominal weight of about 5 oz/yd² (about 170 g/m²). Two dry sheets of the nonwoven fabric were quilted together as in Example 1 to form a two-layer fire-blocking sheet having a weight of about 10 oz/yd². The two-layer fire-blocking sheet was then tested in accordance with the FAA flammability test procedure with two sets of seat cushions. For Comparison B, Cushion Set "c" was used. For Comparison C, use was made of Cushion Set "a", the same higher density, molded polyurethane foam cushion set as was used in the tests of Example 1. Both sets of two-layer 85/15 MPD-I/PPD-T fire-blocking sheets failed the FAA test, with cushion sets of Comparison B exhibiting a more severe failure than those of Comparison C. The results are summarized in Table II.

EXAMPLE 2

The spunlaced, non-apertured, nonwoven fabric of 70/30 MPD-I/PPD-T staple fibers prepared as described in Example 1 and having a nominal basis weight of 1.5 oz/yd2 (about 50 g/m²) was used to make a five-layer fire blocking sheet structure. Five sheets of the nonwoven fabric were quilted together and flammability tested, as described in Example 1, except that Cushion Set "d" was used in preparing the specimens for the FAA Test for Flammability of Seat Cushions. The fabricated polyurethane foam of Cushion Set "d" generally was difficult to protect adequately according to the FAA test. However, as shown by the results summarized in Table 2, the five-layer fire-blocking sheets of the three sets of seat cushion specimens tested in this example passed the FAA test. The burn length did not reach the side of any of the cushions opposite the burner in any of the three tests (i.e., burn lengths did not exceed 17 inches) the weight loss did not exceed 10% for any of the three sets of cushions (the individual results being 9.4%, 10.0%, and 9.7% weight loss) and the average weight loss correspondingly did not exceed 10%, being only 9.7%.

When the above test was repeated with the four-layer fire-blocking sheet of the same spunlaced nonwoven layers as used in this example and in Example 1 (to form what is designated as Comparison D), the sets of seat cushions did not pass the Test for Flammability of Seat Cushions. Two of the sets of seat cushions burned across their entire width (i.e., greater than 17-inch burn length), two of the three sets of cushions had more than 10% weight loss and the average weight loss of the three tested specimens exceeded 10%. Thus, although a four-layer fire-blocking sheet of Example 1 was suitable for use with 3.3-lb/ft³ molded polyurethane foam cushions (Cushion Set "a"), a four-layer fabric of the same composition was not adequate for use with less dense, fabricated, foam cushions (Cushion Set "d"). The results of this example and comparison are included Table II.

EXAMPLE 3

A non-apertured, spunlaced nonwoven fabric of 100% PPD-T staple fibers, having a nominal weight of 1.8 oz/yd² (about 60 g/m²), was prepared substantially as described for the somewhat heavier spunlaced nonwoven fabric of Example 4, below. A four-layer fire-blocking sheet of about 7.2 oz/yd² (about 240 g/m²) was made by quilting together four of these spunlaced fabrics. The four-layer fire-blocking sheet was then tested with Cushion Sets "d", which usually were found to be difficult to protect adequately in order to pass the FAA flammability test. As shown by the results summarized in Table II, the test specimens readily passed the FAA flammability test.

TABLE II

|  | Flame Test Results | | | | | | |
|---|---|---|---|---|---|---|---|
|  | Examples | | | Comparisons | | | |
|  | 1 | 2 | 3 | A | B | C | D |
| Test Fabric |  |  |  |  |  |  |  |
| No. of Layers | 4 | 5 | 4 | 1 | 2 | 2 | 4 |
| MPD-I/PPD-T | 70/30 | 70/30 | 0/100 | 70/30 | 85/15 | 85/15 | 70/30 |
| oz/yd²/layer | 1.5 | 1.5 | 1.8 | 6 | 5 | 5 | 1.6 |
| oz/yd² total | 6 | 7.5 | 7.2 | 6 | 10 | 10 | 6.4 |

TABLE II-continued

| | Flame Test Results | | | | | | |
|---|---|---|---|---|---|---|---|
| | Examples | | | Comparisons | | | |
| | 1 | 2 | 3 | A | B | C | D |
| Cushion Set | a | d | d | a | c | a | d |
| FAA Test | | | | | | | |
| Burn Length | Pass | Pass | Pass | Pass | Fail | Fail | Fail |
| No. >17 in | 0 | 0 | 0 | 0 | 3 | 2 | 2 |
| % Wt. Loss | Pass | Pass | Pass | Fail | Fail | Fail | Fail |
| Spec. 1 | 6.1 | 9.4 | 6.1 | 9.7 | 11.4 | 11.5 | 10.0 |
| Spec. 2 | 9.6 | 10.0 | 6.7 | 9.5 | 10.4 | 10.8 | 12.6 |
| Spec. 3 | 8.6 | 9.7 | 5.8 | 10.9 | 12.7 | 8.6 | 12.0 |
| Average | 8.1 | 9.7 | 6.2 | >10 | 11.5 | 10.3 | 11.6 |

EXAMPLE 4

A batt consisting of 100% of the PPD-T fibers of Example 1 was formed by an air-laydown process of the type described in U.S. Pat. No. 3,797,074. The batt was then formed into a non-apertured, spunlaced nonwoven fabric having a nominal weight of 1.6 oz/yd$^2$ (about 54 g/m$^2$) by a three-stage treatment with columnar hydraulic jets as described in Example 1, except as follows. Each of the orifice sets (designated as Orifice Set C) had a spacing of 7.9 orifices per cm (20 per in), arranged in one row perpendicular to the direction of batt travel, with each orifice having a diameter of 0.178 mm (0.007 in). Table III summarizes the sequence of hydraulic jet treatments applied to the batt. The batt was passed under the jets at a speed of 15.5 m/min (17 ypm). As in Example 1, the batt was given a light hydraulic needling in Stage 1 to consolidate it. In Stage 2, the upper face of the batt was hydraulically needled by jets from three sets of orifices, each set operating at successively higher jet pressures. In Stage 3, the other face of the batt was hydraulically needled by jets from three sets of orifices, each set operating at successively higher jet pressures.

TABLE III

| Stage | Orifice Set | Screen Support | Jet Pressure kPa (psi) |
|---|---|---|---|
| 1 | C | I | 2070 (300) |
| 2 | C | II | 3450 (500) |
| | C | II | 10340 (1500) |
| | C | II | 13800 (2000) |
| 3 | C | II | 3450 (500) |
| | C | II | 10340 (1500) |
| | C | II | 13800 (2000) |

After drying, the the 100% PPD-T spunlaced nonwoven fabric, prepared as described above, was used as the middle layer in a five-layer fire-blocking sheet structure having a total weight of about 9.2 oz/yd$^2$ (about 310 g/m$^2$). The upper two and lower two layers of the fire-blocking sheet were non-apertured, spunlaced nonwoven fabrics having a nominal weight of about 1.9 oz/yd$^2$ (about 65 g/m$^2$), prepared from a 70/30 blend of MPD-I and PPD-T staple fibers, as described in Example 1, except for starting with a correspondingly heavier batt. The five-layer fire-blocking sheet was then combined in the usual manner with Cushion Sets "b" to form five sets of test specimens for flammability testing in accordance with the FAA procedures. All five of the test specimens passed both the flame spread and the weight loss portions of the test. The test results are summarized in Table IV.

EXAMPLE 5

Example 4 was repeated with the following exceptions. The 70/30 MPD-I/PPD-T spunlaced fiber layers each originally weighed 2.2 oz/yd$^2$ (75 g/m$^2$), but were stretched on a tenter frame 19% in the cross-machine direction with 3% overfeed in the machine direction, to achieve a final weight of 1.9 oz/yd$^2$ (about 65 g/m$^2$). These layers were combined with a 100% PPD-T middle layer as in Example 4 to form a five-layer fire-blocking sheet, having a total weight of 9.1 oz/yd$^2$ (about 310 g/m$^2$). The five-layer fire-blocking sheet was formed into FAA flammability test specimens as described hereinbefore. As shown by the results summarized in Table IV, all specimens readily passed the test.

TABLE IV

| Examples 4 & 5 Flammability Test Results | | |
|---|---|---|
| Example | 4 | 5 |
| Burn Length | Pass | Pass |
| Specimens with >17 inches | 0 of 5 | 0 of 3 |
| Percent Weight Loss | Pass | Pass |
| Specimen 1 | 7.2 | 4.4 |
| Specimen 2 | 6.4 | 6.0 |
| Specimen 3 | 9.6 | 7.3 |
| Specimen 4 | 6.6 | — |
| Specimen 5 | 7.7 | — |
| Average | 7.5 | 5.9 |

EXAMPLE 6

A woven rip-stop fabric, woven from yarns comprising a 95/5 blend of MPD-I and PPD-T staple fibers, was heated under pressure for one hour at 250° F. (121° C.) in an aqueous solution of acetophenone containing at least 40% acetophenone by weight of fiber to enhance the crystallinity of the MPD-I fibers. After the woven fabric was cooled, rinsed, scoured, and dried, it had a weight of 3.2 oz/yd$^2$ (about 110 g/m$^2$).

A four-layer fire-blocking sheet having a total weight of 8.6 oz/yd$^2$ (about 290 g/m$^2$) was made with the above-described woven fabric as the top layer. The non-apertured, 70/30 MPD-I/PPD-T, spunlaced nonwoven fabric of Example 4, having a nominal weight of about 1.9 oz/yd$^2$ (about 65 g/m$^2$) was used as the second layer and also as the fourth (bottom) layer in the four-layer fbric. The non-apertured, 100% PPD-T, spunlaced nonwoven fabric having a weight of about 1.6 oz/yd$^2$ (about 54 g/m$^2$) prepared as described in Example 4 was used as the third layer. The four layers were combined to form a four-layer fire-blocking fabric and then fashioned into FAA flammability test specimens as described hereinbefore, with seat Cushion Set "c".

Three sets of flammability test specimens were portion of the test. The burn length did not reach the side of any of the cushions opposite the burner in any the three tests (i.e., burn length was less than 17 inches in each test). The specimens also passed the weight loss portion of the test. The weight loss did not exceed 10% for any of the three specimens. The individual weight losses for the specimens were 6.0%, 6.4% and 6.6% and the average percentage weight loss was only 6.3%.

The fire blocking sheet structures of this invention are puncture-resistant and quite durable. For instance, the seat bottom cushions of Examples 1, 4 and 6, with fire blocking slip covers and dress fabric snugly and securely fitted around them, were subjected to the Seat Wear Test described in European Patent Application Publication No. 0 128 712, pages 15–16 (Boeing Aircraft Company's "Squirmin Herman" Seat Wear Life Test) Each of these seat cushions passed the test and exhibited acceptable appearance after 100 hours of testing, which corresponds to a wear life in commercial airline use of several years.

We claim:

1. A textile fabric suitable for use as a fire-blocking sheet comprising three to seven, fastened together nonwoven layers, each layer being a non-apertured, hydraulically needled batt weighing in the range of 1 to 3 oz/yd$^2$ and consisting essentially of 25 to 100 weight percent of poly(p-phenylene terephthalamide) staple fibers and 0 to 75 weight percent of poly(m-phenylene isophthalamide) staple fibers, the total weight of all the layers being at least 6 oz/yd$^2$.

2. The fabric of claim 1 wherein at least one of the nonwoven layers consists essentially of poly(p-phenylene terephthalamide) fibers.

3. The fabric of claim 1 wherein there are four to six layers.

4. The fabric of claim 1 wherein the individual layers have been stretched in the range of 10 to 20% in the cross-machine direction after hydraulic needling.

5. The fabric of claim 1 wherein the individual layers have a fabric weight in the range of 1.5 to 2.0 oz/yd$^2$.

6. The fabric of claim 1 wherein the nonwoven layers are fastened together by stitches of a flame-resistant thread.

7. The fabric of claim 6 wherein the thread is an aramid thread.

8. The fabric of claim 1 wherein the fastening is a zig-zag stitching in a diamond pattern.

9. The fabric of claim 1 wherein a layer of woven fabric of flame-resistant fibers is incorporated in the textile fabric.

10. A fabric of claim 1, 2 or 6 wherein the total fabric weight is no greater than 10 oz/yd$^2$.

11. A fabric of claim 10 wherein the density of the fabric is in the range of 0.10 to 0.15 grams per cubic centimeter.

12. A fabric of claim 10 wherein the density of the fabric is in the range of 0.11 to 0.14 grams per cubic centimeter.

* * * * *